(No Model.)

E. G. DUNGEY.
ROCK DRILL CHUCK.

No. 245,063. Patented Aug. 2, 1881.

WITNESSES

INVENTOR

By his Attorney

UNITED STATES PATENT OFFICE.

EDWIN G. DUNGEY, OF REPUBLIC, ASSIGNOR TO DANIEL H. MERRITT, OF MARQUETTE, MICHIGAN.

ROCK-DRILL CHUCK.

SPECIFICATION forming part of Letters Patent No. 245,063, dated August 2, 1881.

Application filed June 10, 1881. (No model.)

*To all whom it may concern:*

Be it known that I, EDWIN G. DUNGEY, a citizen of the United States, residing at Republic, in the county of Marquette and State of Michigan, have invented certain new and useful Improvements in Rock-Drill Chucks; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to certain new and useful improvements in chucks, more especially designed for use in the class of rock-drilling machines for connecting the piston-rod and drill; and the object of the invention is to overcome difficulties heretofore existing in that class of machines having the drill inserted in the end of rod and held by a clamp, which is continuously working loose and causing trouble; and also to obviate another very serious difficulty which is found in all other classes of chucks—viz., a tendency to wear out of center, and thereby allow the drill to get out of true, and in rotating describe a circle around the true center, (commonly termed "wabbling,") which causes the drill to stick and bind in the hole, (especially if a deep one,) and sometimes requiring an abandonment of the hole being drilled on that account; and to this end the invention consists in novel features of construction and combination of parts, all as will be hereinafter fully described, and specifically pointed out in the claims.

Figure 1:
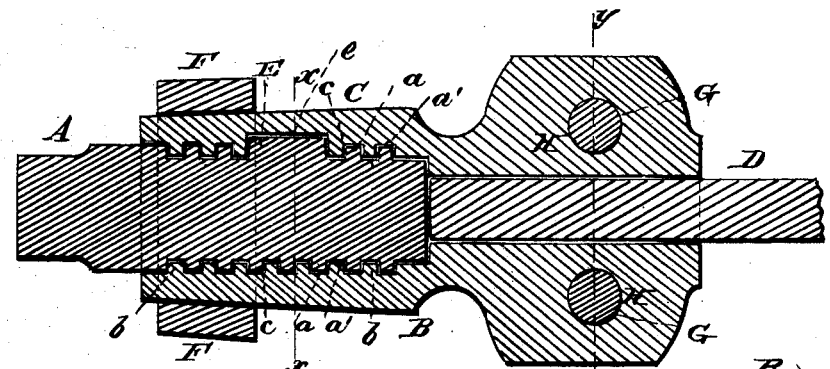
Figure 1:
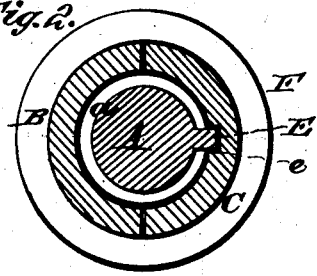
Figure 1:
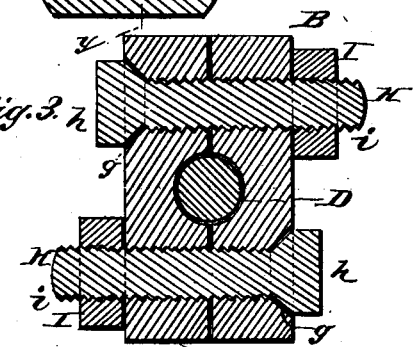
Figure 1:
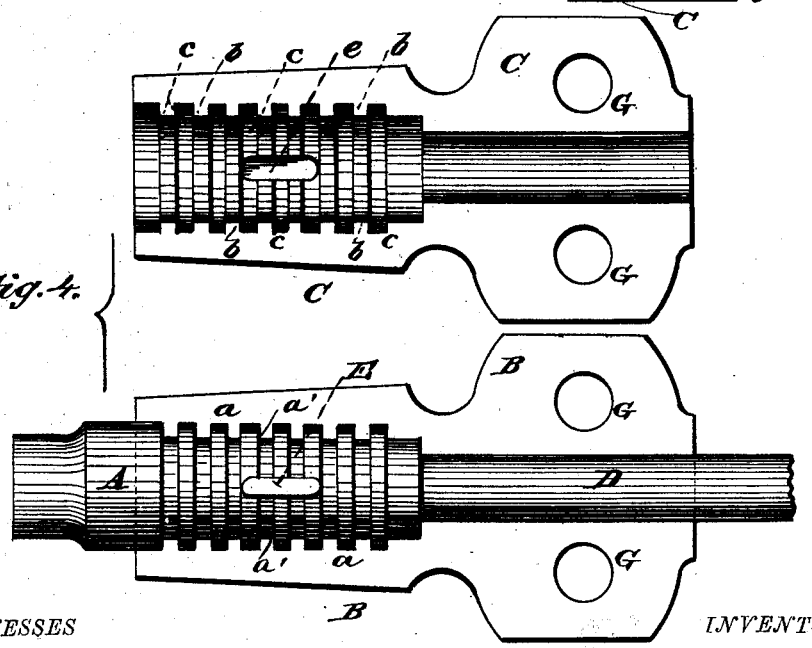

Referring to the accompanying drawings, Figure 1 represents a longitudinal vertical section, showing the drill and piston-rod connected by my improved chuck; Fig. 2, a cross-section through the line $x\,x$ of Fig. 1; Fig. 3, a cross-section through the line $y\,y$ of Fig. 1; Fig. 4, detached views of the two parts composing the chuck and piston-rod.

A represents the piston-rod having its end which is connected to the chuck enlarged and provided with a series of annular rings, $a$, and intermediate annular grooves, $a'$.

B C represent the two parts composing the chuck, which are adapted to apply and fit closely around said piston-rod and the drill D. The parts B C of the chuck are provided with interior semicircular rings, $b$, and grooves $c$, which, when applied to the piston-rod, form annular rings and grooves, which alternate with the rings and grooves of the piston-rod, so that the rings of each fit in the grooves of the other, all as clearly shown in Fig. 1.

The piston-rod is provided with a lug, E, which fits in a recess, $e$, in the part C of the chuck, and thereby prevents the chuck from turning on said rod.

The exterior surface of the chuck is made tapering at the end in which the rod is received, and a wide tapering band, F, adapted to fit over said tapering end in the position shown in Fig. 1, holds the parts of the chuck and piston-rod firmly in position as long as the band is tight thereon. The opposite end of the chuck, in which the drill is secured, is made rectangular in cross-section, and provided with holes G G through the two parts thereof, and recesses $g\,g$ for the reception of the headed ends $h\,h$ of the bolts H H, which pass through the holes and thereby prevent the bolts from turning.

The bolts have screw-threaded ends $i\,i$ for the screw-nuts I I, by which the drill is securely clamped or held between the two parts composing the chuck, all as clearly shown in Fig. 3.

The above-described construction of chuck obviates the objections before referred to, and preserves a uniform center for the drill, while firmly holding it in position.

Having thus fully described my invention, what I claim as new, and desire to secure by Letters Patent, is—

1. The combination of the piston-rod A, having the annular rings $a$ and intermediate grooves, $a'$, the parts B C, composing the chuck, having interior semicircular rings, $b$, and grooves $c$, and means for securing said rod and parts of the chuck together, substantially as specified.

2. The combination of the piston-rod A, having the annular rings and grooves and the lug E, and the chuck composed of the parts B C, having interior rings and grooves, and the recess e, for the reception of said lug, substantially as specified.

3. The combination, with the drill, of the piston-rod A, provided with the rings and grooves a a' and lug E, the chuck composed of the parts B C, having rings and grooves b c, recess e, and exterior conical surface, the clamping-band F, and countersunk headed bolts and screw-nuts, substantially as herein shown and described.

In testimony whereof I affix my signature in presence of two witnesses.

EDWIN G. DUNGEY.

Witnesses:
 W. D. REES,
 GEO. WILSON.